United States Patent
Sadowski

(10) Patent No.: US 9,594,588 B2
(45) Date of Patent: Mar. 14, 2017

(54) METHOD AND APPARATUS OF ADAPTIVE APPLICATION PERFORMANCE

(71) Applicant: Advanced Micro Devices, Inc., Sunnyvale, CA (US)

(72) Inventor: Greg Sadowski, Cambridge, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 34 days.

(21) Appl. No.: 14/175,443

(22) Filed: Feb. 7, 2014

(65) Prior Publication Data

US 2015/0227387 A1  Aug. 13, 2015

(51) Int. Cl.
G06F 3/00 (2006.01)
G06F 9/44 (2006.01)
G06F 9/46 (2006.01)
G06F 13/00 (2006.01)
G06F 1/28 (2006.01)

(52) U.S. Cl.
CPC . *G06F 9/46* (2013.01); *G06F 1/28* (2013.01)

(58) Field of Classification Search
None
See application file for complete search history.

(56) References Cited

U.S. PATENT DOCUMENTS

2005/0108075 A1* 5/2005 Douglis et al. .......... 705/8
2012/0299554 A1* 11/2012 Kruglick ............ H02J 7/0073
                                                          320/160

* cited by examiner

*Primary Examiner* — Craig Dorais
(74) *Attorney, Agent, or Firm* — Volpe and Koenig, P.C.

(57) ABSTRACT

A method and apparatus of adaptive application performance includes a determination of at least one criteria for implementing adaptive application performance measures. Based upon the determination, adaptive application performance measures are implemented.

12 Claims, 4 Drawing Sheets

METHOD AND APPARATUS OF ADAPTIVE APPLICATION PERFORMANCE

FIELD OF THE INVENTION

The present invention is generally directed to application performance, and in particular, to adaptive application performance based upon criteria.

BACKGROUND

Users of mobile devices often recharge their devices in different ways. For example, the usual minimum charge level, the amount of charge added to battery in one recharging session, and the frequency of recharging of batteries may all be different from user to user. However, applications typically run at a single performance level no matter what the habits of the user are in recharging.

SUMMARY OF EMBODIMENTS

A method of adaptive application performance includes a determination of at least one criteria for implementing adaptive application performance measures. Based upon the determination, adaptive application performance measures are implemented.

An apparatus for adaptive application performance includes a battery and a controller, wherein the controller is configured to control at least one application such that based upon at least one criteria, the controller causes the application to run at a predefined performance level.

A computer readable storage medium containing a first set of instructions includes a determining code segment for determining at least one criteria for implementing adaptive application performance measures, and an implementing code segment for implementing adaptive application performance measures based upon the at least one criteria.

A controller includes circuitry configured to control at least one application. Based upon at least one criteria, the controller causes the application to run at a predefined performance level.

BRIEF DESCRIPTION OF THE DRAWINGS

A more detailed understanding may be had from the following description, given by way of example in conjunction with the accompanying drawings wherein.

DETAILED DESCRIPTION

By monitoring the habits of battery recharging events, a mobile device operating system (OS) may anticipate enough availability of energy and therefore improve the overall performance of the device by adaptive boosting of performance for various applications. The users who need more performance and who charge their devices frequently enough get more performance.

Figure 1:
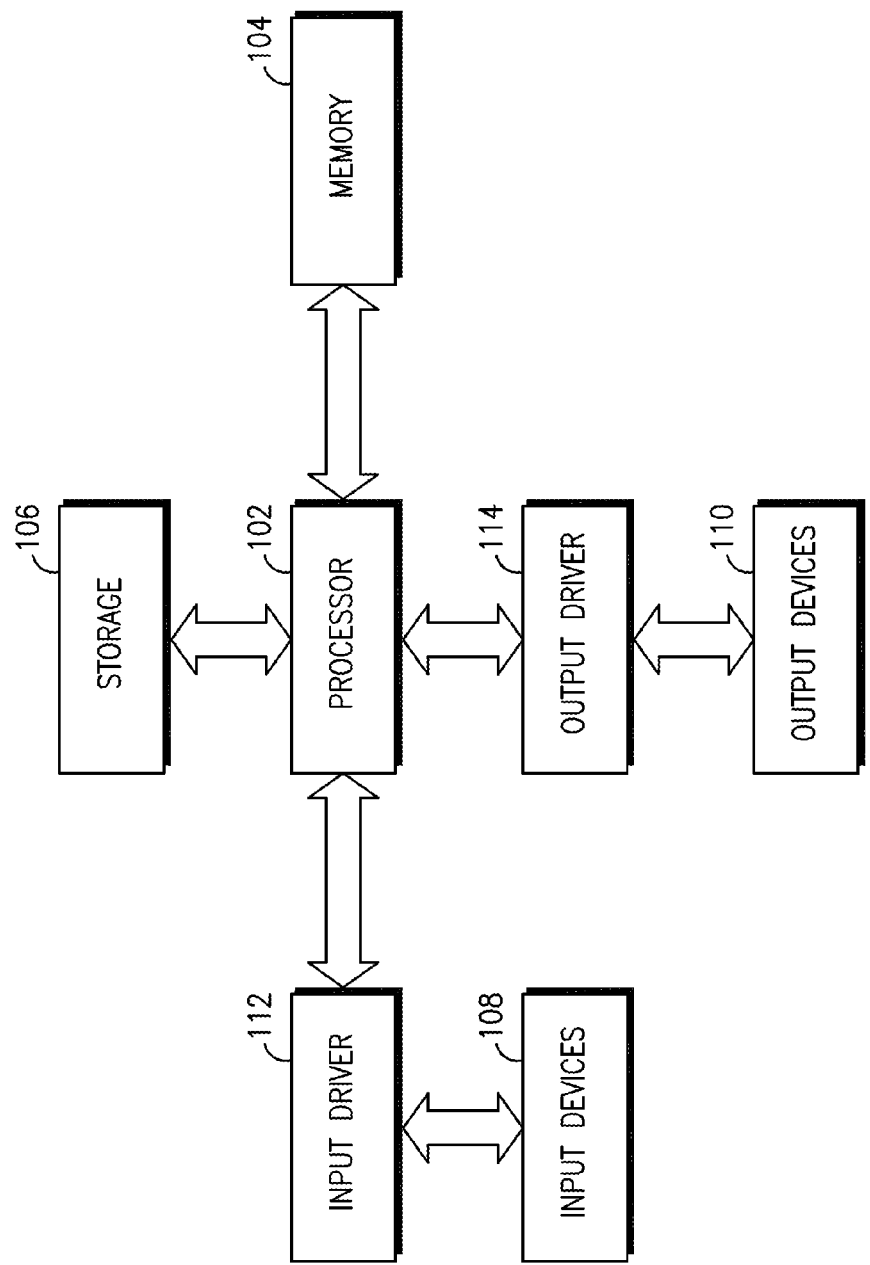
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
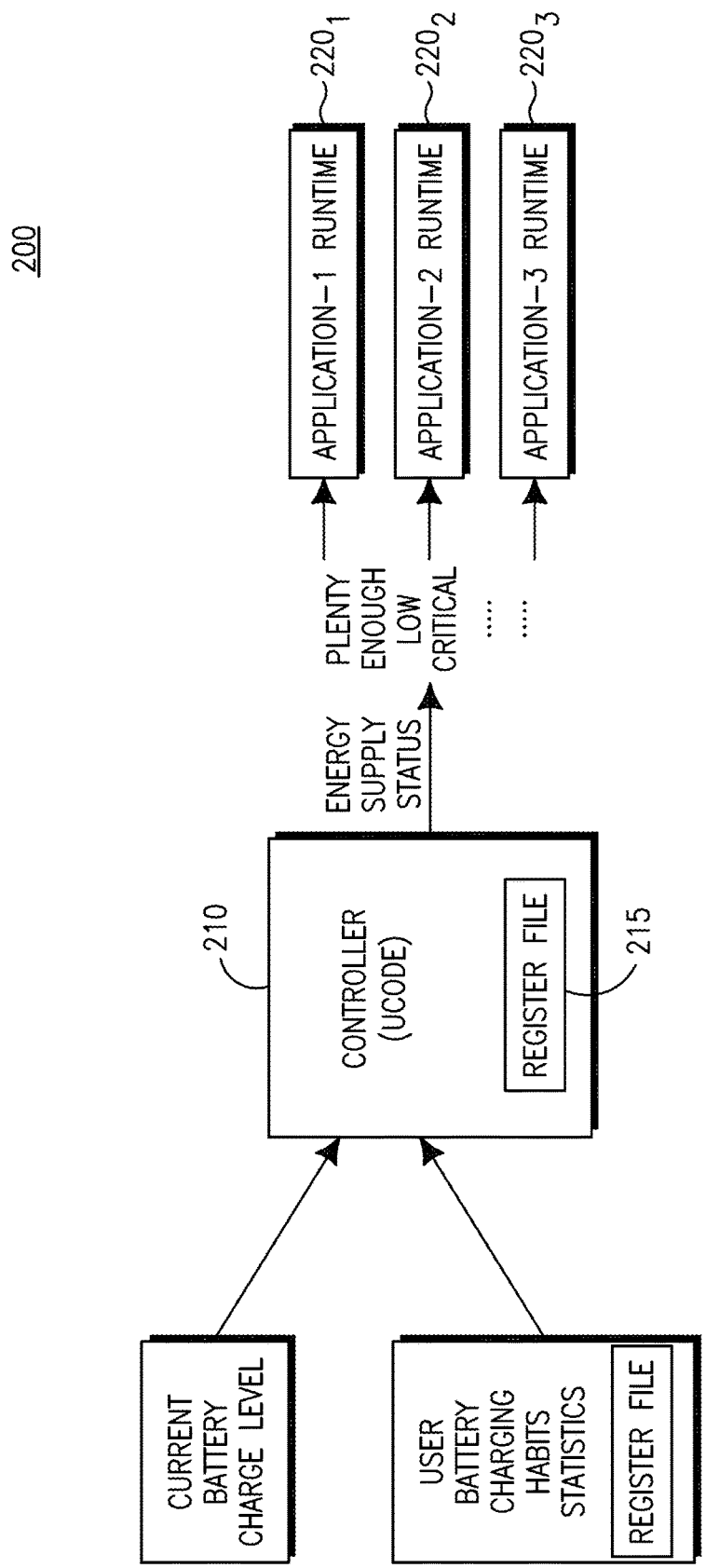
FIG. 2 is a functional block diagram of an example system for implementing application adaptive performance.

FIG. 2 is a functional block diagram of an example system 200 for implementing application adaptive performance. The system 200 includes a controller 210, which may include a register file 215. The controller 210, which may be a microcode (ucode) controller, may be included in the device 100 or may be external to the device 100. Where the controller 210 is external to the device 100, a wireless connection may exist between the controller 210, along with associated transceiver circuitry (not shown), in order to facilitate communication between the controller 210 and other components, such as a battery (not shown). The controller 210 is capable of receiving data, such as a current battery charge level of the device 100 and user battery charging habits statistics, which may be included in the register file 215 in the controller.

The microcode controller is an example implementation, (e.g., hardware, software, or a combination), of the control algorithm that decides what level of energy should be reported to an application, for example based on user battery charging habits and current charge level. The 215 register file may include the data about particular applications, based on previous experience, (e.g., how long the application has run last time, how it usually runs—runs and quits, or runs in bursts, etc.), and how well the application responds to suggested energy levels. Instead of interviewing the application on which energy levels it supports, the controller may store that information in its register file. The 215 register file may also replicate some of the data from the register file in the "user battery habit stats" block, for example such as when access to that register file is power expensive. This may be the case, for example, for a wireless remote.

The controller 210 controls applications 220, (designated $220_1$, $220_2$, and $220_3$), such that their runtime performance may be adapted based on the data the controller has on the current battery charge level and the user battery charging habits statistics. Accordingly, the energy supply status, (e.g., plenty, enough, low, or critical) may be utilized to determine the runtime performance for Application-1 ($220_1$), Application-2 ($220_2$), and Application-3 ($220_3$). It should be noted that all, some, or none of the applications 220 may support adaptive runtime performance. For example, Applications 1 and 2 may support adaptive runtime performance, while Application-3 may not.

Figure 3:
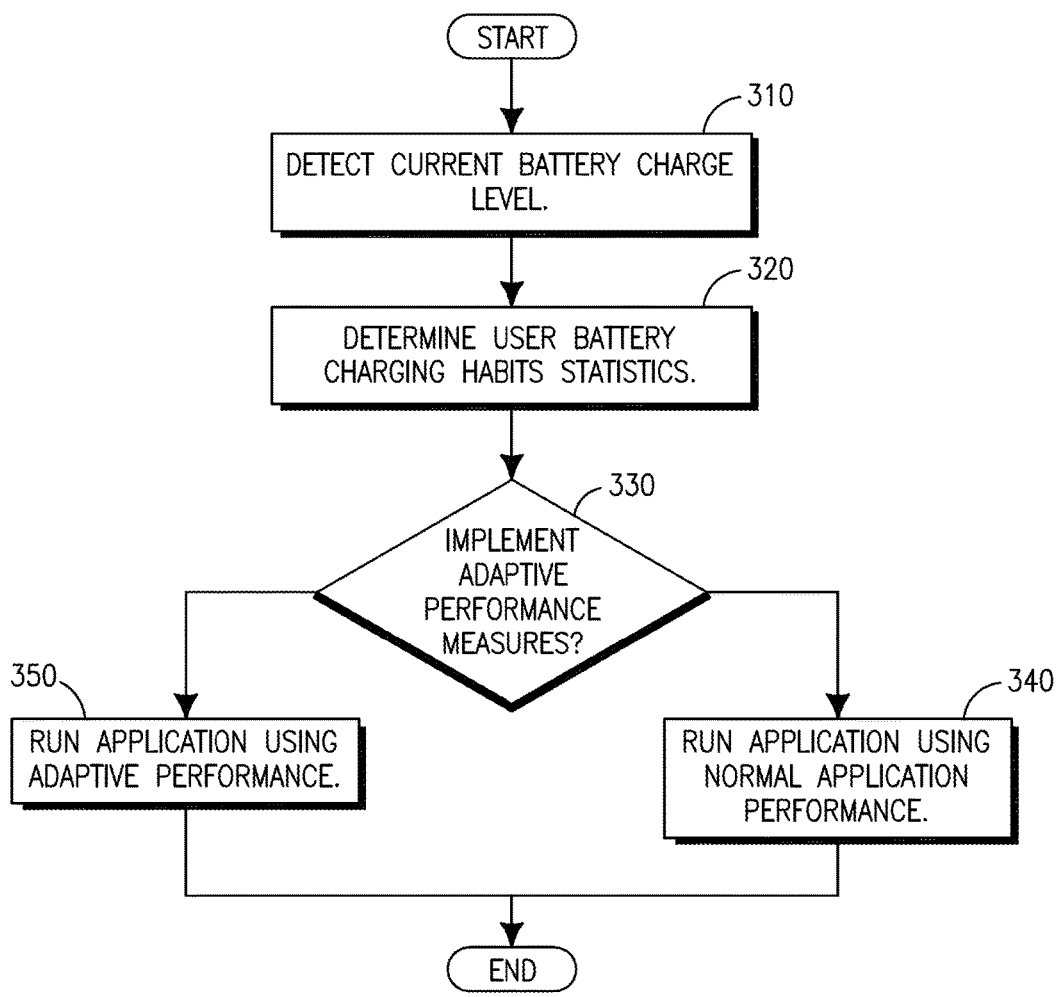
FIG. 3 is a flow diagram of an example method of application adaptive performance.

FIG. 3 is a flow diagram of an example method 300 of application adaptive performance. In step 310, the current battery charge level is detected, or determined. For example, the battery charge level could be at a first level, (e.g., low), a second level, (e.g., high), or at a third level, (e.g., full). It should be noted that although three charge levels are used in the present example method 300, any number of charge levels could be considered.

Various criteria, such as the charging habits and statistics of a user, are determined for consideration of implementing adaptive runtime performance (step 320). For example, it may be detected and/or stored how often a user recharges the battery of the device, (e.g., rare, often, frequent), the nominal minimum level of the battery prior to the charging by the user, (e.g., low, medium, high), and/or the nominal amount of charge that the battery is charged, (i.e., the "recharge delta"), during a particular recharging by the user, (e.g., low, medium, full).

Once the data from steps 310 and 320 is considered, a decision is made whether to implement adaptive performance measures (step 330). For example, based upon the gathered statistics, in method 330, an available energy supply level may be determined. For purposes of example, three energy supply levels are described, (i.e., low, enough, and plenty), however, it should be noted that any number of energy levels may be utilized for the purposes of implementing adaptive performance measures.

Table 1 below shows an example table of determining energy supply levels in accordance with the method 300, where the statistics considered are the battery charge level and the user recharging frequency.

TABLE 1

| Recharging frequency | | | | |
|---|---|---|---|---|
| frequent | enough | plenty | plenty | |
| often | enough | plenty | plenty | |
| rare | low | enough | plenty | |
| | low | high | full | Battery level |

Accordingly, in Table 1, an available energy supply level of "low", "enough", or "plenty" may be determined based upon the criteria of the recharging frequency and the battery charge level. For example, in Table 1, it may be seen that an energy supply level of "low" is determined only when both the recharging frequency is rare and the battery charge level is low.

Another example embodiment, where the criteria used for determination of the available energy supply level is based on a recharge delta, nominal minimum battery charge level before the battery is recharged, and the recharge frequency may be seen in Table 2 below.

TABLE 2

| recharge delta | MIN level | recharge frequency | availability of energy |
|---|---|---|---|
| low | low | rare | low |
| low | med | rare | low |
| low | high | rare | enough |
| med | low | rare | enough |
| med | med | rare | enough |
| med | high | rare | plenty |
| full | low | rare | enough |
| full | med | rare | enough |
| full | high | rare | plenty |
| low | low | often | low |
| low | med | often | enough |
| low | high | often | enough |
| med | low | often | enough |
| med | med | often | enough |
| med | high | often | plenty |
| full | low | often | plenty |
| full | med | often | plenty |
| full | high | often | plenty |
| low | low | frequent | low |
| low | med | frequent | enough |
| low | high | frequent | enough |
| med | low | frequent | enough |
| med | med | frequent | plenty |
| med | high | frequent | plenty |
| full | low | frequent | plenty |
| full | med | frequent | plenty |
| full | high | frequent | plenty |

The categories above in Table 2 may be determined based on calculations such as, for example, how much charge one can expect to be added to the battery during a given time period, based on expected minimum charge level (i.e., just before charging), or time-intervals between re-charging, among other criteria. Although in table 2, the "critical" level is not shown as an available energy level, the critical level may trigger that critical status being indicated to a user immediately as warning, (e.g., "The system will shut down in 1 minute under current conditions").

Once the determination is made in step 330 whether to implement adaptive performance measures, applications may then be run using normal application performance (step 340), or using an alternative adaptive performance (step 350). Table 3 below shows an example implementation, using example Applications 1, 2, and 3, (e.g., Applications $220_1$, $220_2$, and $220_3$).

TABLE 3

| | Available energy supply levels | | |
|---|---|---|---|
| | low | enough | plenty |
| Application-1 | only minimum performance | increased performance and more features | Full performance and all features |
| Application-2 | basic features and performance | | enhanced feature set and higher performance |
| Application-3 | runs the same way in all cases, as this revision doesn't support adaptation to energy levels | | |

As described above, Applications 1 and 2 support adaptive runtime performance, while Application-3 does not, in the present example. Accordingly, it can be seen in Table 3 above that should the available energy supply level be determined to be "low", then Application-1 is run with only minimum performance, Application-2 is run with basic features and performance. Where the available energy supply level is determined to be "enough", Application-1 is run at increased performance and more features, while Application-2 remains running with basic features and performance, (i.e., the same as if the available energy supply level was "low"). Should the available energy supply level be determined to be "plenty", then Application-1 is run at full performance and utilizes all features, while Application-2 is now run with an enhanced feature set and at higher performance. Application-3, as can be seen in Table 3, runs the same way in all cases as the application, application revision, doesn't support adaptation based on available energy supply levels.

Figure 4:
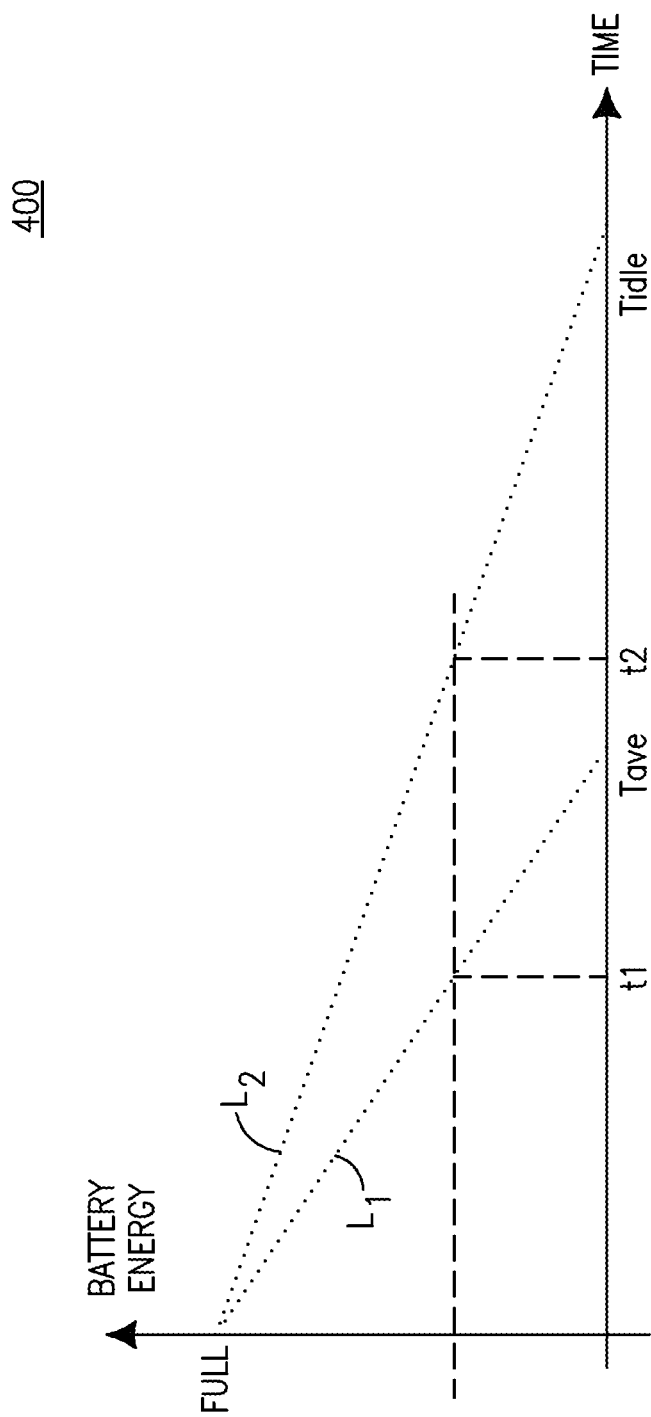
FIG. 4 is an example graphical diagram of an implementation of application adaptive performance.

FIG. 4 is an example graphical diagram 400 of an implementation of application adaptive performance. The discharge of the battery may be modeled in an example embodiment to be linear, and based on known capacity of the battery and other characteristics of the device 100, it may be calculated how long the device can last with usual load (Tave), shown by line $L_1$ run, or no load or idle (Tidle), shown by line $L_2$. Based on measured battery charge level, it then be calculated how much time is left at an average load and in idle. For example, knowing a charge level indicated by the horizontal dashed line of FIG. 4, both t1, (i.e., the amount of time left before the battery completely discharges at Tave), and t2, (i.e., the amount of time left before the battery completely discharges at Tidle) can be determined. Effectively, FIG. 4 shows a graph for calculating when the battery will run out of energy. Since information as to how the battery is charged, when it will be recharged, and how much power a given application may draw, (e.g., based on past usage, based on current usage, also on what application declares), it can be determined what level of energy to report to the application(s) 220 at any given moment. And accordingly, the applications 220 may determine the performance level at which to operate.

It should be understood that many variations are possible based on the disclosure herein. Although features and elements are described above in particular combinations, each feature or element may be used alone without the other features and elements or in various combinations with or without other features and elements. For example, other variables may influence the performance of a battery, such as the temperature, and accordingly, ambient temperature, may be utilized as a criteria for determining whether to implement adaptive performance.

Additionally, there may be overrides to the method of adaptive application performance depending on the circumstances. For example, in a cloud-client system, it may be desirable to play some commercials at full performance regardless how much energy is available. Accordingly, the adaptive performance method may be overridden and the client may be directed to play a commercial at optimal performance. The adaptive control method may also change over time while adapting to users, applications, weather, or other external circumstances. It may operate differently, for example, on weekends and holidays.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium, (e.g., a non-transitory computer-readable storage medium), for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of adaptive application performance in an electronic device, comprising:
   determining an available energy supply level of the electronic device for implementing adaptive application performance measures, wherein the determining is based upon a recharging frequency and a recharge delta;
   determining whether the available energy supply level is a first energy level, a second energy level that is higher than the first energy level, or a third energy level that is higher than the first and second energy levels;
   calculating a time remaining until the electronic device runs out of energy based on the available energy supply level;
   categorizing each of one or more applications into a first category and a second category based upon the application supporting adaptive performance measures; and
   implementing adaptive application performance measures, wherein an execution performance level for each of the one or more applications is determined based upon the time remaining, and the available energy supply level, and
   wherein the implementing adaptive application performance measures includes executing the applications categorized in the first category at a reduced performance level if the available energy level is in the first or second energy levels, executing the applications categorized in the first category at an increased performance level if the available energy level is in the third category, and executing the applications categorized in the second category at the increased performance level if the available energy level is in the first, second or third category.

2. The method of claim 1 wherein the available energy supply level is further determined based upon at least one additional criteria including any at least one of the following: a battery charge level, a charge capacity of the battery, an ambient temperature, or a minimum recharge level.

3. The method of claim 1 wherein, based upon a second criteria, overriding the implementing adaptive application performance measures.

4. The method of claim 3 wherein upon the determination that the implementing adaptive application performance measures is to be overridden, running an application at an optimal performance level.

5. An apparatus for adaptive application performance, comprising:
- a battery; and
- a controller, wherein the controller is configured to:
  - determine an available energy supply level of the battery based upon at least one criteria, wherein the criteria includes a recharging frequency and a recharge delta,
  - determine whether the available energy supply level is a first energy level, a second energy level that is higher than the first energy level, or a third energy level that is higher than the first and second energy levels,
  - calculate a time remaining until the electronic device runs out of energy based on the available energy supply level,
  - categorize each of one or more applications into a first category and a second category based upon the application supporting adaptive performance measures, and
  - cause each of one or more applications to run at a predefined execution performance level based on the time remaining, wherein the execution performance level for each of the one or more applications is determined based upon the time remaining, and the available energy supply level, wherein the causing includes running the applications categorized in the first category at a reduced performance level if the available energy level is in the first or second energy levels, running the applications categorized in the first category at an increased performance level if the available energy level is in the third category, and running the applications categorized in the second category at the increased performance level if the available energy level is in the first, second or third category.

6. The apparatus of claim 5 wherein the available energy supply level is further determined based upon at least one additional criteria including any at least one of the following: a battery charge level, a capacity of the battery, an ambient temperature, or a minimum recharge level.

7. The apparatus of claim 5 wherein, based upon a second criteria, the controller is further configured to override the predefined execution performance level.

8. A non-transitory computer readable storage medium containing a first set of instructions, comprising:
- A first determining code segment for determining at least one criteria an available energy supply level of an electronic device for implementing adaptive application performance measures, wherein the determining is based upon one of a recharging frequency or a recharge delta;
- a second determining code segment for determining whether the available energy supply level is a first energy level, a second energy level that is higher than the first energy level, or a third energy level that is higher than the first and second energy levels;
- a calculating code segment for calculating a time remaining until the electronic device runs out of energy based on the available energy supply;
- a categorizing code segment for categorizing each of one or more applications into a first category and a second category based upon the application supporting adaptive performance measures; and
- an implementing code segment for implementing adaptive application performance measures, wherein an execution performance level for each of the one or more applications is determined based upon the time remaining, and the available energy supply level, and wherein the implementing adaptive application performance measures includes executing the applications categorized in the first category at a reduced performance level if the available energy level is in the first or second energy levels, executing the applications categorized in the first category at an increased performance level if the available energy level is in the third category, and executing the applications categorized in the second category at the increased performance level if the available energy level is in the first, second or third category.

9. A controller implemented in an electronic device, the controller comprising:
- circuitry configured to:
  - determine an available energy supply level of a battery based upon at least one criteria, wherein the criteria includes a recharging frequency and a recharge delta,
  - determine whether the available energy supply level is a first energy level, a second energy level that is higher than the first energy level, or a third energy level that is higher than the first and second energy levels,
  - calculate a time remaining until the electronic device runs out of energy based on the available energy supply level,
  - categorize each of one or more applications into a first category and a second category based upon the application supporting adaptive performance measures, and
  - cause each of one or more applications to run at a predefined execution performance level associated with the time remaining, wherein the execution performance level for each of the one or more applications is determined based upon the time remaining, and the available energy supply level, wherein the causing includes running the applications categorized in the first category at a reduced performance level if the available energy level is in the first or second energy levels, running the applications categorized in the first category at an increased performance level if the available energy level is in the third category, and running the applications categorized in the second category at the increased performance level if the available energy level is in the first, second or third category.

10. The controller of claim 9 wherein the available energy supply level is further determined based upon at least one additional criteria including any at least one of the following: a battery charge level, a capacity of the battery, an ambient temperature, or a minimum recharge level.

11. The controller of claim 9 wherein, based upon a second criteria, the controller is further configured to override the predefined execution performance level.

12. The controller of claim 11 wherein upon a determination that the predefined execution performance level is to be overridden, the controller is further configured to cause an application to run at an optimal performance level.

* * * * *